United States Patent [19]

De Witt, Jr.

[11] Patent Number: 5,321,068
[45] Date of Patent: Jun. 14, 1994

[54] FIBER OF POLYADIPAMIDE POLYMER CONTAINING ADDED SUCCINIC ACID

[75] Inventor: Marion R. De Witt, Jr., Midlothian, Va.

[73] Assignee: E. I. Du Pont de Nemours and Company, Wilmington, Del.

[21] Appl. No.: 980,904

[22] Filed: Nov. 24, 1992

[51] Int. Cl.⁵ .......................... C08K 5/11; D02G 3/00
[52] U.S. Cl. ..................................... 524/321; 428/364
[58] Field of Search .......................... 524/321; 428/364

[56] References Cited

U.S. PATENT DOCUMENTS

| | | | |
|---|---|---|---|
| Re. 30,474 | 1/1981 | Malpass et al. | 524/321 |
| 3,311,691 | 9/1963 | Good | 264/290 |
| 3,320,226 | 5/1967 | Cappuccio et al. | 524/321 |
| 3,655,821 | 4/1972 | Lofquist | 524/321 |
| 3,947,424 | 7/1974 | Tomek | 260/45.75 |
| 4,401,782 | 8/1983 | Conklin et al. | 524/321 |
| 4,435,535 | 3/1984 | Grimm | 524/321 |
| 4,602,058 | 7/1986 | Graham et al. | 524/321 |
| 5,116,919 | 12/1990 | Buzinkai et al. | 525/420 |

Primary Examiner—Kriellion S. Morgan

[57] ABSTRACT

Polyadipamide yarn is made by a melt-spinning process in which sufficient succinic acid is added to the polymer prior to melt spinning so that the polymer and thus the resulting yarn contain by weight about 50 ppm to about 3000 ppm succinic acid.

15 Claims, No Drawings

FIBER OF POLYADIPAMIDE POLYMER CONTAINING ADDED SUCCINIC ACID

BACKGROUND OF THE INVENTION

The present invention relates to fiber of a polyadipamide polymer such as a yarn of nylon 66 or nylon 46 polymer and processes for making such fiber.

Polyadipamides such as nylon 66 and nylon 46 are desirable for use in the manufacture of high strength yarns for industrial use. Increasing the relative viscosity (RV) of polyadipamides enables tenacity to be increased to higher levels than are customarily obtainable with lower RV polymer. However, the high viscosity polymer has been found to limit production rates due to the high pressure drops which occur as the molten polymer is pumped to the spinneret. In addition, the use of high RV polymer 66 sometimes results in high yarn break levels and low yarn strength which limit yield of the resulting yarn.

Succinic acid is typically present at low levels in polyadipamides since it is present as an impurity in the adipic acid used to make the polymer. Typical levels of succinic acid in the polymer are in the range of 10 to about 25 parts-per-million (ppm) by weight.

SUMMARY OF THE INVENTION

In the manufacture of polyadipamide fiber, it has been discovered that increasing the succinic acid to a level above that typically present as an impurity provides significant advantages in the spinning of fiber of polyadipamides. In accordance with the invention, polyadipamide yarn is made by a melt-spinning process in which sufficient succinic acid is added to the polymer prior to melt spinning so that the polymer and thus the resulting yarn contains by weight about 50 ppm to about 3000 ppm succinic acid. Preferably, the polymer contains about 100 ppm to about 3000 ppm succinic acid.

The invention is advantageously used when the polymer has a relative viscosity of at least about 55, preferably, at least about 90.

In a preferred form of the invention, the process comprises at least one drawing step and the yarn is drawn at least about 5.5× and the tenacity of the yarn is preferably at least about 9.0 g/d.

The polyadipamide preferably is comprised of at least 85% of polymer units selected from the class consisting of hexamethylene adipamide and tetramethylene adipamide. Most preferably, the polyadipamide is poly(hexamethylene adipamide).

DETAILED DESCRIPTION

Polyadipamide is intended to refer to predominantly aliphatic polyamide homopolymers and copolymers which contain adipamide units, i.e., are made using adipic acid as a polymer ingredient. Preferred polyadipamides are comprised of at least about 85% hexamethylene adipamide (66 nylon) and tetramethylene adipamide (46 nylon) polymer units. Poly(hexamethylene adipamide) (66 nylon) is the most preferred polyamide for the practice of the present invention.

Any of a variety of known polymerization batch or continuous techniques can be used for the manufacture of the polyadipamide polymer. U.S. Pat. No. 3,947,424 discloses a particularly suitable continuous polymerization process.

Succinic acid can be added to the polymer in one of several forms. The acid itself or succinic anhydride can be added. It is also possible to add a soluble salt of succinic acid such as an alkali metal salt. In this application, percent or parts-per-million succinic acid are intended to refer to the amount of succinic acid as the acid regardless its form when added.

The amount of succinic acid in the polymer is about 50 ppm to about 3000 ppm. At levels below about 50 ppm, the presence of the succinic acid does not have a significant effect. At levels of succinic acid above about 3000 ppm, the succinic depresses RV, especially at high RV levels. Preferably, the amount of succinic acid in the polymer is about 100 ppm to about 3000 ppm. Although typically the amount present as an impurity in the adipic acid is not significant, it may be desirable for the amount of such succinic acid to be taken into account when determining the amount of succinic acid to be added if it is present at higher than typical levels.

Whatever its form, the succinic acid can be added to the salt solution used to make the polymer. Alternately, the succinic acid can be added directly to the polymer in flake form or to molten polymer. Polymer concentrates containing succinic acid can also be used in flake form to mix with the main source polymer flake or be supplied in molten form and mixed with a molten stream of the main polymer source. Regardless of how the succinic acid is added, the polymer should mixed so the succinic acid is thoroughly distributed throughout the polymer before spinning.

The invention is particularly well-suited for processes where the RV of the polyamide is at least about 55, most preferably, at least about 90. If the polymer source is at a lower RV than is desired for the fiber to be spun, the RV of the polyamide can be increased by any of a variety of known methods involving either melt phase or solid phase polymerization. A particularly advantageous process for increasing the RV of the polymer is the process disclosed in U.S. Pat. No. 5,116,919.

The polymer can be spun into fiber using conventional techniques for the melt-spinning of nylon. The invention is particularly advantageous for the manufacture of high strength industrial yarns, i.e., having a tenacity of greater than about 9.0 g/d. Preferred processes for making such yarns include one or more drawing steps to impart a total draw of at least about 5.5. Techniques which are particularly useful for spinning high tenacity industrial yarns in accordance with this invention are disclosed in U.S. Pat. No. 3,311,691.

As illustrated in Examples which follow, incorporating succinic acid into polyadipamides in accordance with the invention provides a reduction in pressure drop as the molten polymer is supplied to the spinneret. This pressure drop reduction permits higher polymer throughputs and thus higher production rates. Alternately, the polymer RV can be increased without pressure drop penalties to provide a fiber containing higher RV polymer. Improvements in yarn tenacity and decreased spin breaks are also observed.

TEST METHODS

Relative Viscosity of the polyadipamide refers to the ratio of solution and solvent viscosities measured at 25° C. in a solution of 8.4% by weight polymer in a solvent of formic acid containing 10% by weight of water.

Denier or linear density is the weight in grams of 9000 meters of yarn. Denier is measured by forwarding a known length of yarn, usually 45 meters, from a multifilament yarn package to a denier reel and weighing on a balance to an accuracy of 0.001 g. The denier is then calculated from the measured weight of the 45 meter length.

Tenacity is measured as described by Li in U.S. Pat. No. 4,521,484 at col. 2, line 61 to col 3, line 6.

Amine and carboxyl ends are determined by the methods described on pages 293 and 294 in Volume 17 of the "Encyclopedia of Industrial Chemical Analysis" published by John Wiley & Sons, Inc. in 1973.

EXAMPLE 1

In this Example, varying amounts of succinic acid are added to nylon 66 polymer made in a continuous polymerization unit and spun into industrial yarn to illustrate the effects on tenacity, transfer line pressure, relative viscosity, and spin breaks per kilogram (kg). The results are reported in Table 1.

Item A (Control)

To a 51% by weight aqueous solution of hexamethylenediammonium adipate at an initial pH of ~7.40 as measured at a 9.5 weight % concentration at 25° C. are added 2-(2'-pyridyl)ethylphosphonic acid (PEPA) to comprise 0.042 weight % of the polymer to be formed, potassium bromide to comprise approximately 0.10 weight % of the polymer to be formed, potassium iodide to comprise approximately 0.05 weight % of the polymer to be formed, cupric acetate to comprise approximately 0.021 weight % of the polymer to be formed, and potassium bicarbonate to comprise approximately 0.16 weight % of the polymer to be formed. The succinic acid present in the raw materials is approximately 0.0014 of the polymer to be formed (14 ppm).

The resulting nylon salt solution is then polymerized as in U.S. Pat. No. 3,947,424 and spun into 1260 denier industrial yarn using a process as disclosed in U.S. Pat. No. 3,311,691.

Item B (Invention)

The process of Item A is repeated except that additional succinic acid is added to the nylon salt solution to comprise a total of 0.0081 weight % of the polymer to be formed (81 ppm).

Item C (Invention)

The process of Item A is repeated except additional succinic acid is added to the nylon salt solution to comprise a total of 0.0134 weight % of the polymer to be formed (134 ppm).

For items A, B and C above, pressure drop of the high viscosity polymer is monitored between the finisher vessel and the spinning manifold, yarn RV is measured, spin breaks are monitored, and yarn properties are measured and the results are reported in Table 1 below.

Items B and C compared to Item A show a reduction in transfer line pressure drop at constant polymer RV with the added succinic acid. Item C compared to Item A also demonstrates an improvement in yarn tenacity and decreased spin breaks.

EXAMPLE 2

In this Example, an amount of succinic acid as indicated in Table 1 are added to nylon 66 polymer made in a continuous polymerization unit similarly to Example 1. In this example, however, transfer line pressure was maintained constant by increasing the RV. Transfer line pressure and RV are monitored and are reported in Table 2 below.

Item D (Control)

The process of Example 1, Item A is repeated (no additional succinic acid is added). As in Item A, succinic acid is present in the raw materials to comprise 0.0014 weight % of the polymer to be formed (14 ppm).

Item E (Invention)

The process of Item D is repeated except that additional succinic acid is added to the nylon salt solution to comprise 0.0134 weight % of the polymer to be formed (134 ppm) and the RV was increased by approximately 3 RV units to a level which maintains the transfer line pressure constant.

Item E when compared to Item D illustrate that RV can be increased by employing the invention without increasing transfer line pressures.

TABLE 1

|  | SUCCINIC IN POLYMER | TRANSFER LINE psig (kPa) | YARN RV | SPIN BREAKS/ 1000 kg | TENACITY g/d |
|---|---|---|---|---|---|
| Item A | 14 ppm | 2950 (20330) | 98 | 2.75 | 10.2–10.4 |
| Item B | 81 ppm | 2700 (18600) | 98 | 2.75 | — |
| Item C | 134 ppm | 2700 (18600) | 98 | <1.1 | 10.5+ |
| Item D | 14 ppm | 2850 (19640) | 95.4 | — | — |
| Item E | 134 ppm | 2850 (19640) | 98.6 | — | — |

EXAMPLE 3

Polymer batches with the compositions indicated in Table 2 as Items F-I are prepared in the laboratory under atmospheric pressure using the same polymerization procedure for each Item. The succinic acid content of Item F is contributed only as an impurity in the polymer ingredients.

Milliequivalents (meq) of amine groups (NH$_2$) and carboxyl groups (COOH) and RV are measured and the results are as shown in Table 2 below:

TABLE 2

|  | SUCCINIC, ppm | NH$_2$, meq | COOH, meq | RV |
|---|---|---|---|---|
| Item F | 3 | 45.8 | 72 | 47.2 |
| Item G | 300 | 44.8 | 81 | 49.3 |
| Item H | 3,000 | 46.2 | 74 | 48.8 |
| Item I | 30,000 | 90.3 | 49 | 20.8 |

Item I illustrates that at high RV levels, the succinic acid depresses RV markedly. Also, it can be seen that the amine ends increase and the COOH ends decrease with increasing succinic addition. This is contrary to literature references (Synthetic Hetero-chain Polyamides, V. V. Korshak and T. M. Frunze, pages 20–21) that state succinic acid is an amine end capper.

I claim:

1. In a process for making polyadipamide yarn by melt-spinning polyadipamide polymer, the improvement which comprises:

adding sufficient succinic acid to the polymer prior to melt spinning so that the polymer contains by weight about 50 ppm to about 3000 ppm succinic acid.

2. The process of claim 1 wherein sufficient succinic acid is added so that the polymer contains about 100 ppm to about 3000 ppm succinic acid.

3. The process of claim 1 wherein said polymer has a relative viscosity of at least about 55.

4. The process of claim 1 wherein said polymer has a relative viscosity of at least about 90.

5. The process of claim 1 wherein said process further comprises at least one drawing step and the yarn is drawn at least about 5.5×.

6. The process of claim 5 wherein the tenacity of yarn is at least about 9.0 g/d.

7. The process of claim 1 wherein at least 85% of the polyadipamide is comprised of polymer units selected from the class consisting of hexamethylene adipamide and tetramethylene adipamide.

8. The process of claim 1 wherein said polyadipamide is poly(hexamethylene adipamide).

9. A fiber comprised of a polyadipamide polymer containing by weight about 50 ppm to about 3000 ppm succinic acid, said succinic acid being provided in said fiber by sufficient succinic acid being added to the polymer prior to melt spinning.

10. The fiber of claim 9 wherein the polyadipamide polymer contains by weight about 100 ppm to about 3000 ppm succinic acid.

11. The fiber of claim 9 wherein the relative viscosity of the polyadipamide is at least about 55, relative viscosity being measured at 25° C. in a solution of 8.4% by weight polymer in a solvent of formic acid containing 10% by weight of water.

12. The fiber of claim 9 wherein the relative viscosity of the fiber at least about 90, relative viscosity being measured at 25° C. in a solution of 8.4% by weight polymer in a solvent of formic acid containing 10% by weight of water.

13. The fiber of claim 9 wherein at least 85% of the polyadipamide is comprised of polymer units selected from the class consisting of hexamethylene adipamide and tetramethylene adipamide.

14. The fiber of claim 12 wherein said polyadipamide polymer is nylon 66 polymer.

15. The fiber of claim 9 wherein said fiber comprises a continuous filament yarn having a tenacity of at least about 9.0 g/d.

* * * * *